United States Patent
Hayashi

(10) Patent No.: US 6,747,974 B1
(45) Date of Patent: Jun. 8, 2004

(54) SWITCHING APPARATUS

(75) Inventor: Kentaro Hayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/527,446

(22) Filed: Mar. 17, 2000

(30) Foreign Application Priority Data

Jun. 28, 1999 (JP) ............................................. 11-181208

(51) Int. Cl.[7] .............................................. H04L 12/56
(52) U.S. Cl. ...................... 370/395.1; 370/473; 370/474
(58) Field of Search .......................... 370/395.1, 395.31, 370/395.64, 473, 474

(56) References Cited

U.S. PATENT DOCUMENTS

| | | | | |
|---|---|---|---|---|
| 6,449,276 | B1 | * 9/2002 | Subbiah et al. | 370/395.6 |
| 6,483,810 | B1 | * 11/2002 | Ono et al. | 370/244 |
| 6,490,286 | B1 | * 12/2002 | Ono et al. | 370/395.31 |
| 6,594,267 | B1 | * 7/2003 | Dempo | 370/395.64 |
| 6,603,767 | B1 | * 8/2003 | Murakami et al. | 370/395.64 |

FOREIGN PATENT DOCUMENTS

JP     11074892     3/1999

* cited by examiner

*Primary Examiner*—Chi Pham
*Assistant Examiner*—Nhat Do
(74) *Attorney, Agent, or Firm*—Venable LLP; Michael A. Sartori

(57) ABSTRACT

A switching apparatus includes an input packet processing circuit, a switch, and an output packet processing circuit. The input packet processing circuit includes an included packet filling arrangement in which, at the time of mapping processing for mapping respective included packets associated with switching including packets for switching processing, a number of included packets corresponding to the length of the switching including packets and the length of the associated included packets is mapped in one switching including packet as long as the header information thereof can be shared in common. The switching apparatus has increased switching capacity.

8 Claims, 8 Drawing Sheets

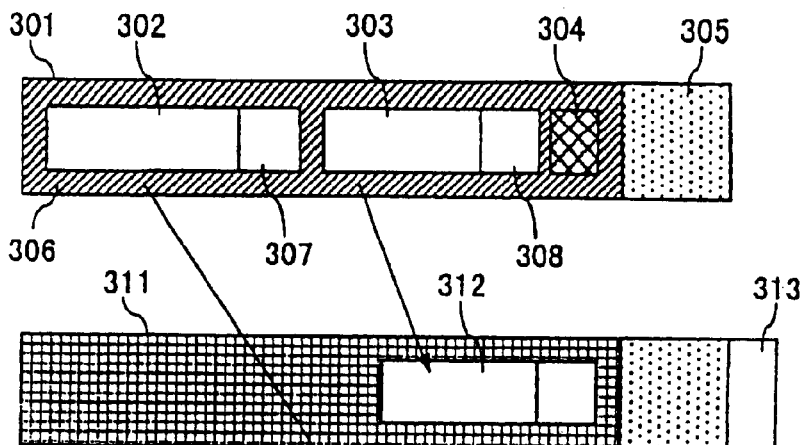
FIG. 3A
FIG. 3B
FIG. 3C
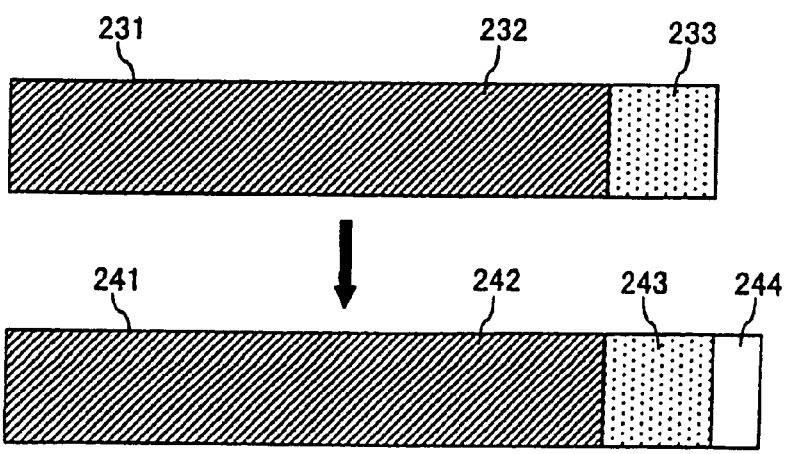
FIG. 2A
FIG. 2B

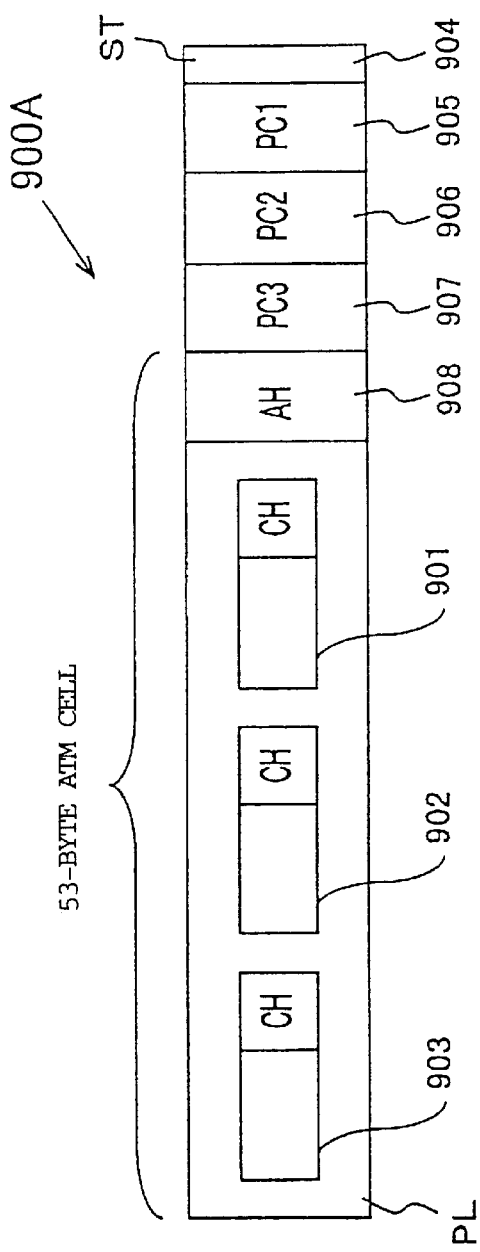
F I G . 9 A
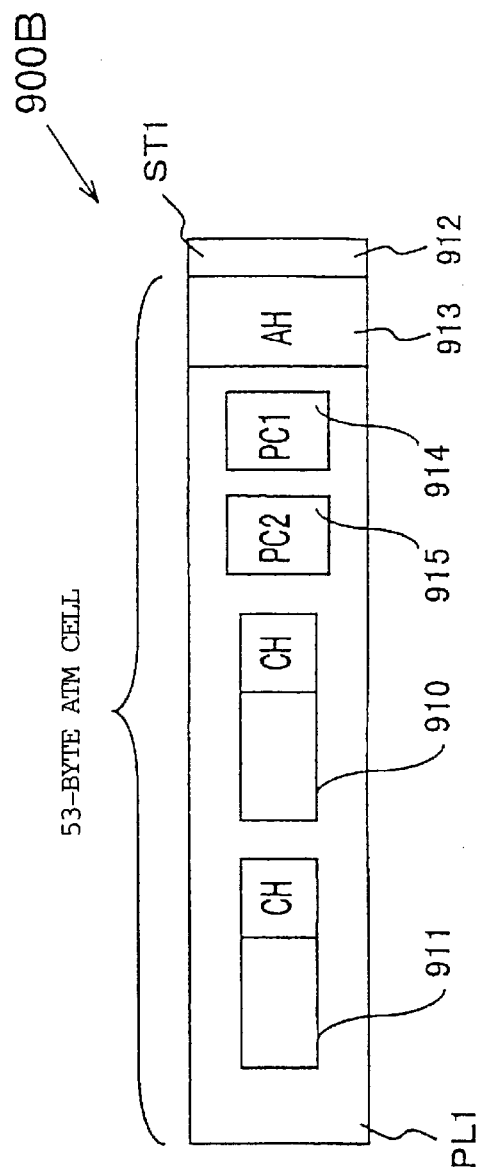
F I G . 9 B

SWITCHING APPARATUS

BACKGROUND OF THE INVENTION

1. Field of the Invention

The present invention relates to a switching apparatus and, more particularly to, a switching apparatus to be preferably applied, for example, to an ATM switching system that performs switching process both in the AAL2 layer and the ATM layer.

2. Description of Related Art

Conventionally, the ATM (Asynchronous Transfer Mode) switching system performs processing such as switching and/or transmission of all information in the unit of fixed-length data called cells. The cell comprises a 5-byte header and 48-byte payload.

On the other hand, in the field of communications services that employ several ATM switching techniques and particularly mobile communications systems, a feasibility study on a voice-coding system that makes it possible to compress a voice with high efficiency is being carried out.

For example, using the voice-coding system called ITU-T (International Telecommunications Union—Telecommunications Standardization Division), Recommendation G. 729 (CS-ACELP) makes it possible to compress a voice rate of 64 kbps to 8 kbps or less.

However, in this case, assuming the cell assemble delay time to be approximately 6 ms for a 64 kbps voice and in order to fully fill the payload portion of an ATM cell with a voice at a rate of 8 kbps, a delay of approximately 48 ms would occur, which corresponds to eight times the delay time.

The cell may be transmitted without fully filling the payload portion of the ATM cell with voice information in order to shorten the cell assembly delay time. This would shorten the cell assembly delay time but would cause the payload to have wasted regions, resulting in reduced efficiency.

In order to overcome these problems, the AAL2 layer specifications have been recommended based on the ITU Recommendation I.363.2 as a new AAL (ATM Adaptation Layer). A I.366.1 is also available as an associated recommendation, a specification provided to allow an information frame longer than a voice such as a data stream to be divided and carried on the AAL2.

Although the aforementioned problems are overcome by the application of the AAL2, switching in AAL2 connection units, that is, a switching function in CPS packet units is required in addition to the switching function in ATM cell units in the case of handling the AAL2 by the ATM switching system. A conventional switching system that is provided with such a switching function is described in Japanese Patent Kokai No. 11-74892.

The cell switching system comprises an input packet processing circuit (input port), which determines whether an input including packet, for example, an ATM cell, includes an included packet, for example, a CPS (Common Part Sublayer) packet, and which performs, for an including packet which includes said included packet, demultiplexing processing of said included packet, header processing for the header of said included packet, and mapping processing for mapping each respective demultiplexed included packet associated with a switching including packet for switching processing; a switch (for example, a cell switch) for performing switching processing of said switching including packet and a switching including packet which does not include said included packet; and an output packet processing circuit which determines whether a switching including packet which is switched and outputted from said switch includes an included packet and which performs, for a switching including packet which includes said included packet, demultiplexing processing of said included packet and re-mapping processing for mapping said demultiplexed included packet in an including packet that is different from a switching including packet.

This cell switching system has made it possible to handle both the ATM cell not including CPS packets (short packets) and the ATM cell including CPS packets without providing a special configuration to a cell switch for a conventional ATM cell.

The configuration of said cell switching system 10 is shown in FIG. 1.

Referring to FIG. 1, the cell switching system 10 is provided, on the input side of an ATM switch 108, with a plurality of input ATM cell processing circuits 100 (the first) through 101 (the nth); on the output side of an ATM switch 108, with a plurality of output ATM cell processing circuits 120 (the first) through 115 (the nth).

In the foregoing, the ATM switch 108 is a typical ATM switch that is a component corresponding to said cell switch.

Since respective input ATM cell processing circuits have a common internal configuration, only the first input ATM cell processing circuit 100 coupled to the first input port is explained.

The input ATM cell processing circuit 100 (corresponding to said input packet processing circuit) comprises an input ATM cell header processing circuit 102, an input ATM cell allocating circuit 103, an input AAL2 processing circuit 104, cell buffers 105 and 106, and an input ATM cell multiplexing circuit 107.

Said input ATM cell header processing circuit 102 is a circuit for attaching a switching tag to be used for processing in the switching system 10 to the head portion of an inputted ATM cell. For example, FIG. 2A shows said ATM cell before being attached with the tag, while FIG. 2B shows said ATM cell after being attached with the tag.

Referring to FIG. 2A, an ATM cell 231 comprises an ATM cell payload 232 and an ATM cell header 233. In FIG. 2B, an in-switch ATM cell 241 comprises an in-switch ATM cell payload 242, an in-switch ATM cell header 243, and said switch tag 244. The switch tag 244 comprises a CPS packet identifier that indicates whether the cell payload 232 of said ATM cell 231 includes a CPS packet.

Said input ATM cell allocating circuit 103 is a circuit that allocates in-switch ATM cells by referring to the CPS packet identifier of the switch tag 244. In this allocation, the in-switch ATM cell that includes a CPS packet is allocated to the side of the input AAL2 processing circuit 104, while the in-switch ATM cell that does not include a CPS packet is allocated to an input ATM cell buffer circuit 106.

The input AAL2 processing circuit 104 is a circuit that performs processing of the AAL2 layer, that is, the terminating processing circuit of the AAL2 layer in accordance with the ITU-T Recommendation I.363.2. This terminating processing of the AAL2 layer performs the demultiplexing processing of individual. CPS packets and the mapping processing to the payload portion of the in-switch ATM cell.

The input AAL2 processing circuit 104 includes a CPS packet layer processing circuit 104A, a CPS packet header processing circuit 104B, and a CPS packet converting circuit 104C, from the input side in that order.

The first CPS packet layer processing circuit 104A is, among processing of the AAL2 layer, in charge of demultiplexing the CPS packets as well as providing the headers of the in-switch ATM cells that have undergone said demultiplexing to the subsequent CPS packet header processing circuit 104B.

The CPS packet layer processing circuit 104A refers to the CID (Channel ID), that is, a connection identifier at the AAL2 layer level included in the CPS packet header and performs header processing. This header processing converts, for example, said CID.

The last CPS packet converting circuit 104C in the input AAL2 processing circuit 104 performs packing (mapping) CPS packets into the payload portion of the in-switch ATM cell. This mapping operation is to allow said ATM switch 108 to make it possible to execute the switching processing for CPS packets in the same manner as for typical ATM cells.

CPS packets 302 and 303 of an ATM cell 301 that are inputted into the input ATM cell header processing circuit 102 under the state as shown in FIG. 3A are inserted into separate payloads 311 and 321 of the in-switch ATM cell like an in-switch CPS packet 2 and an in-switch CPS packet 1 which are shown in FIGS. 3B and 3C, as a result of this mapping operation. The in-switch ATM cell has a configuration with switching tags 313 and 323 attached to the head of a typical ATM cell.

According to Recommendation I.363.2, the length of the CPS packet is stipulated to be 48 bytes at maximum as a default. In general, at the time of this mapping, no such problem would occur wherein mapping in the payload portion of the in-switch ATM cell can hardly be carried out due to an excessively long CPS packet.

Moreover, in FIG. 3A, reference numeral 304 is a CPS packet control field, 305 is an ATM cell header, and 306 is an ATM cell header.

Next, in FIG. 1, since the aforementioned output ATM cell processing circuit has a common internal configuration, only the first output ATM cell processing circuit 120 coupled to the first output port is explained.

The output ATM cell processing circuits 120 (corresponding to said output packet processing circuit) comprises an output ATM cell allocating circuit 109, an output AAL2 processing circuit 110, output ATM cell buffers 111 and 112, an output ATM cell multiplexing circuit 113, and an output ATM cell header processing circuit 114.

The output ATM cell allocating circuits 109 determine whether an in-switch ATM cell includes a CPS packet, based on the CPS packet identifying information written in the switching tag of an inputted in-switch ATM cell. If the in-switch ATM cell includes a CPS packet, then an ATM cell derived from the in-switch ATM cell of which a switching tag is removed therefrom is supplied to the output AAL2 processing circuit 110.

The output AAL2 processing circuit 110 performs the processing-of the AAL2 layer. The output AAL2 processing circuit 110 includes a CPS packet converting circuit 110A and a CPS packet layer processing circuit 110B, from the input side in that order.

The first CPS packet converting circuit 110A takes out a CPS packet inserted in the payload of an inputted ATM cell and then supplies the same to the following CPS packet layer processing circuit 110B.

The CPS packet layer processing circuit 110B that has received a CPS packet subsequently checks whether a plurality of continuous CPS packets inputted from the CPS packet converting circuit 110A can be inserted into the payload of one ATM cell. Meanwhile, the CPS packet layer processing circuit 110B multiplexes one or more CPS packets into a payload of one ATM cell and then, for example, assembles to output the ATM cell 301 in the format shown in FIG. 3A.

However, in the aforementioned cell switching system, individual CPS packets were taken out of the ATM cell of the AAL2 connection, one CPS packet was mapped to the payload of one in-switch ATM cell, and switching was provided by the ATM switch in units of said in-switch ATM cell.

Therefore, since the size of the CPS cell becomes smaller than the payload portion of the in-switch ATM cell, a corresponding wasted region is created.

In particular, in a compressed voice, one CPS packet has a region considerably smaller than said payload portion (48 bytes). For example, in the case of employing CODEC according to G.729, the length of information has 10 bytes and only 13 bytes when combined with three bytes of the CPS packet header, having a wasted region of 35 bytes (=48–13).

That is, according to the size of the wasted region, the resource of the cell switching system is used wastefully, thereby increasing the proportion of reducing the switching capacity and the extent of disadvantages.

OBJECT AND SUMMARY OF THE INVENTION

In order to solve the aforementioned problems, the switching apparatus according to the present invention comprises an input packet processing circuit which determines whether an input including packet includes an included packet and which performs, for an including packet which includes said included packet, demultiplexing processing of said included packet, header processing for the header of said included packet, and mapping processing for mapping each respective demultiplexed included packet associated with a switching including packet for switching processing; a switch for performing switching processing of said switching including packet and a switching including packet which does not include said included packet; and an output packet processing circuit which determines whether a switching including packet which is switched and outputted from said switch includes an included packet and which performs, for a switching including packet which includes said included packet, demultiplexing processing of said included packet and re-mapping processing for mapping said demultiplexed included packet in an including packet that is different from a switching including packet; wherein the input packet processing circuit comprising included packet filling means wherein, at the time of said mapping processing, a number of included packets corresponding to the length of said switching including packets and the length of the associated included packets is mapped in one switching including packet as long as the header information thereof can be shared in common.

BRIEF DESCRIPTION OF THE DRAWINGS

FIGS. 2A and 2B show an explanatory diagram of the operation of the conventional ATM switching apparatus.

FIGS. 3A through 3C show an explanatory diagram of the operation of the conventional ATM switching apparatus.

FIG. 9A and FIG. 9B are general diagrams showing the configuration of the ATM cell of a switching system used in another embodiment.

DETAILED DESCRIPTION OF THE EMBODIMENTS

The first through third embodiments of a switching apparatus according to the present invention will be explained with reference to an ATM switching system that performs both the switching processing in the AAL2 layer and the switching processing in the ATM layer.

Although one CPS packet was mapped to the payload of one in-switch ATM cell without exception, the first embodiment is characterized by mapping as many CPS packets as possible to the payload of one in-switch ATM cell according to the length of associated CPS packets.

In other words, the present embodiment can be considered to be characterized by inserting as many successive CPS packets as possible into the payload portion of the same in-switch ATM cell without allowing the total length of the packets to exceed the range available in the payload of the ATM cell for accommodating the packets, provided that the successive CPS packets have the same destination information and the same corresponding VPI and VCI.

The Configuration of the First Embodiment

Figure 4:
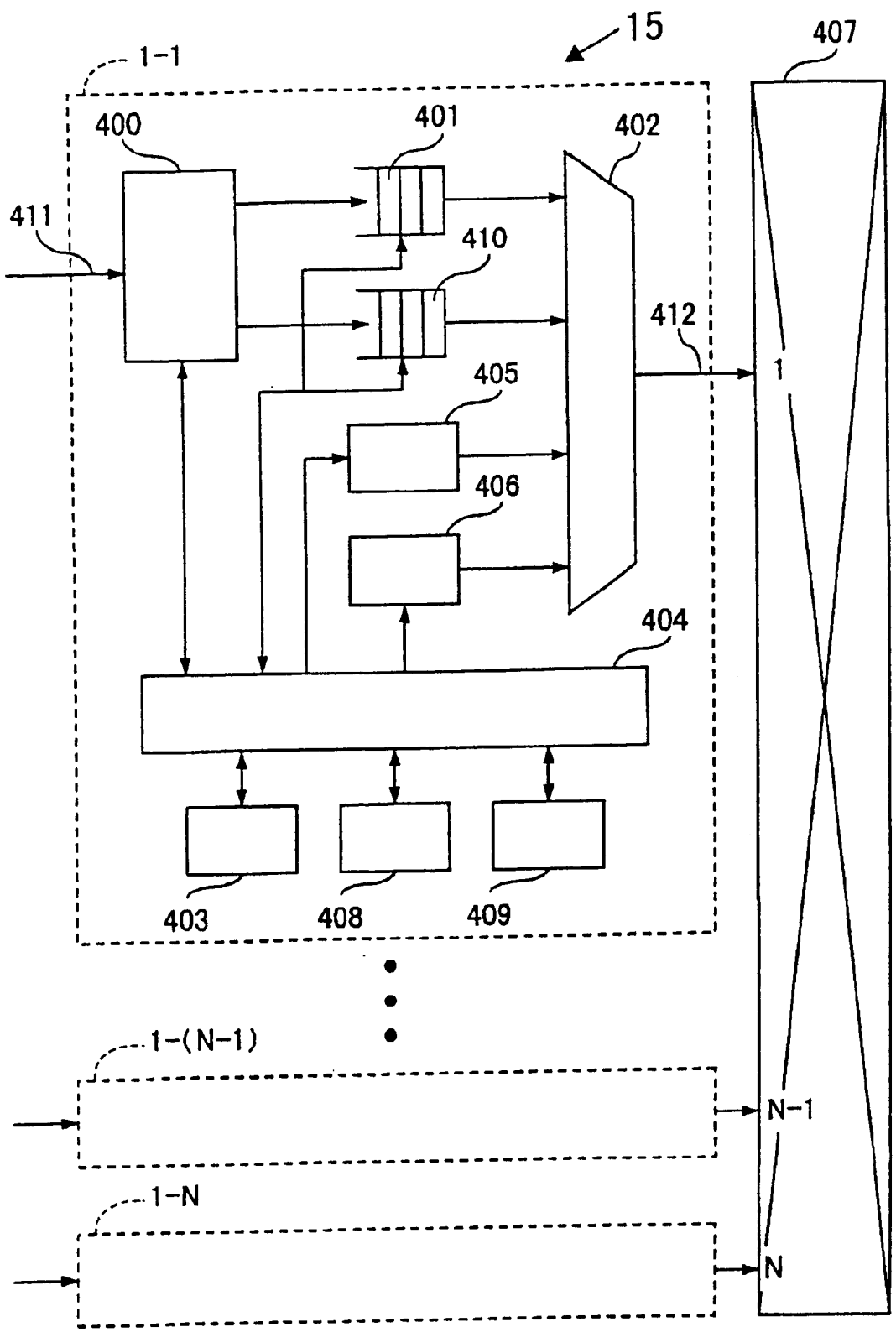
FIG. 4 is a block diagram showing the configuration of the input side of a first embodiment of the ATM switching apparatus according to the invention.
Figure 8:
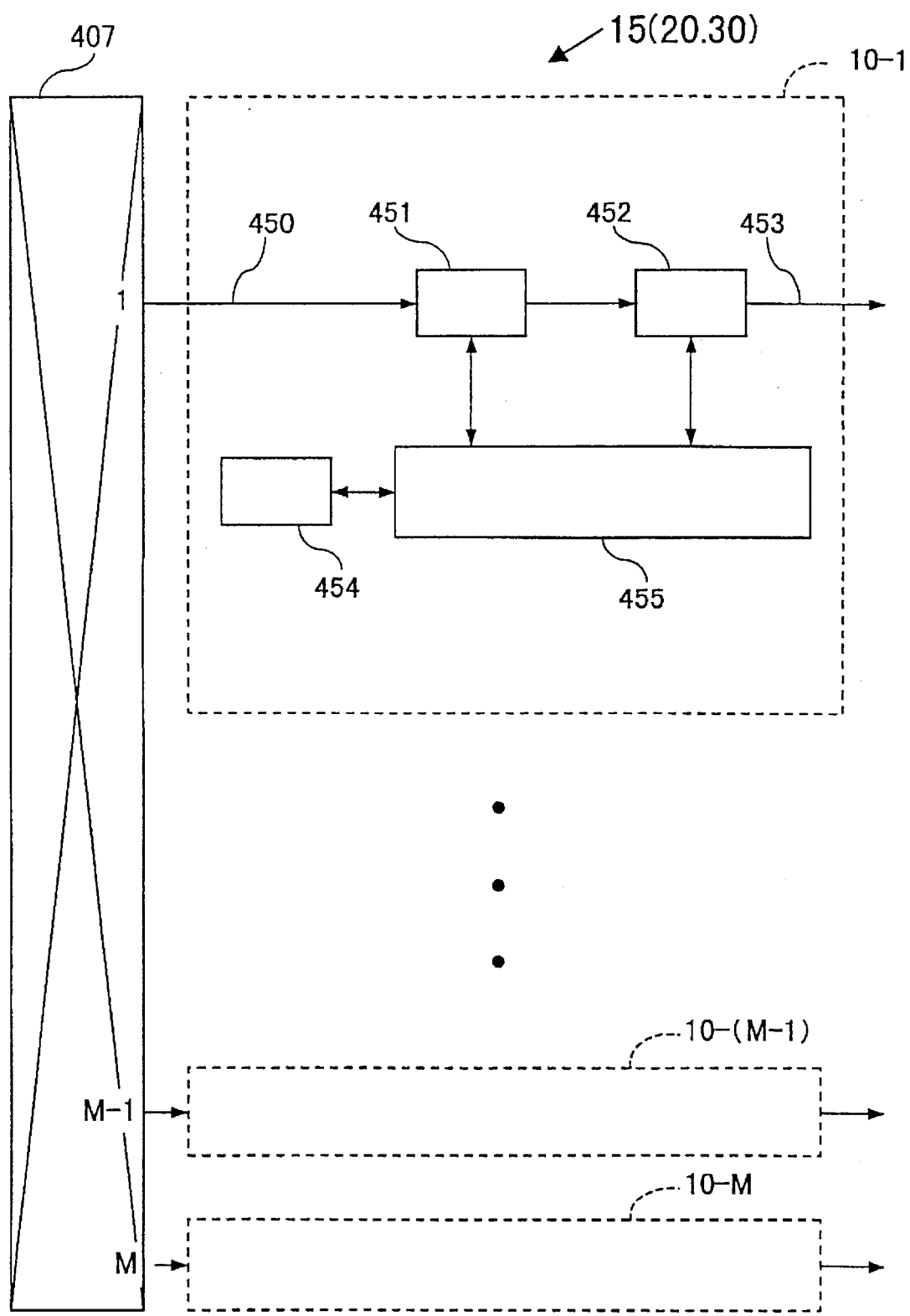
FIG. 8 is a block diagram showing the configuration of the output side of the first through third embodiments of the ATM switching apparatus according to the present invention.

FIG. 4 and FIG. 8 show the configuration of an ATM switching system 15 according to this embodiment. FIG. 4 shows the configuration of the input side, while FIG. 8 shows that of the output side. Said ATM switching system 15 allows an ATM cell that includes CPS packets and an ATM cell that does not include CPS packets to be inputted.

Referring to FIG. 4, like said ATM switch 108, the ATM switch circuit 407 is a component corresponding to said cell switch, being an ordinary ATM switch.

Said ATM switch circuit 407 having a configuration N×M is provided, on the input side thereof, with N input ports 1-1 through 1-N, which are shown by being enclosed by a dashed line and each of which is coupled to input terminals 1 through N of the ATM switch circuit 407. Since each input port has substantially the same internal configuration, the input port 1-1 is explained here.

The input port 1-1 comprises an input ATM cell processing circuit 400, an input CPS packet buffer circuit 401, a transmitted information selecting circuit 402, a header converting table 403, a control circuit 404, an internal ATM cell header transmitting circuit 405, a pad pattern transmitting circuit 406, an input CPS packet buffer control circuit 408, a timer circuit 409, an input cell buffer circuit 410, an input terminal 411, and an output terminal 412.

Next, the relationship between the connections of these respective portions is explained.

Said input terminal 411 is coupled to the input ATM cell processing circuit 400, while the ATM cell processing circuit 400 is coupled to the control circuit 404, to the input CPS packet buffer circuit 401, and to the input cell buffer circuit 410.

In addition, the input CPS packet buffer circuit 401 is coupled to the transmitted information selecting circuit 402 (a selector) as well as to the control circuit 404. The input cell buffer circuit 410 is coupled to the transmitted information selecting circuit 402 as well as to the control circuit 404.

Said internal ATM cell header transmitting circuit 405 and said pad pattern transmitting circuit 406 are coupled to the transmitted information selecting circuit 402 as well as to control circuit 404. The transmitted information selecting circuit 402 is coupled to the ATM switch circuit 407 via the output terminal 412 as well as to the control circuit 404. The header converting table 403, the input CPS packet buffer control circuit 408, and the timer circuit 409 are coupled to the control circuit 404.

Furthermore, the control circuit 404 is a processor arranged at each input port separately from a processor provided as the central processor of said ATM switching system 15.

In function aspects, said input ATM cell processing circuit 400 has a function for performing typical ATM layer processing to be carried out for inputted ATM cells, such as header conversion (the converting processing of VPI/VCI values) in response to the contents of the header converting table 403 as well as a function for determining whether said ATM cell includes a CPS packet based on the connection information of said VCI value and/or VPI value.

Furthermore, the input ATM cell processing circuit 400 transmits the information on CID (Channel ID (Channel Identifier)=CPS packet identifier) owned by the header of a CPS packet to the control circuit 404, thereby providing a basis for identifying (a plurality of) CPS packets with which the payload of one in-switch ATM cell is to be filled to the control circuit 404 and the input CPS packet buffer control circuit 408.

Figure 1:
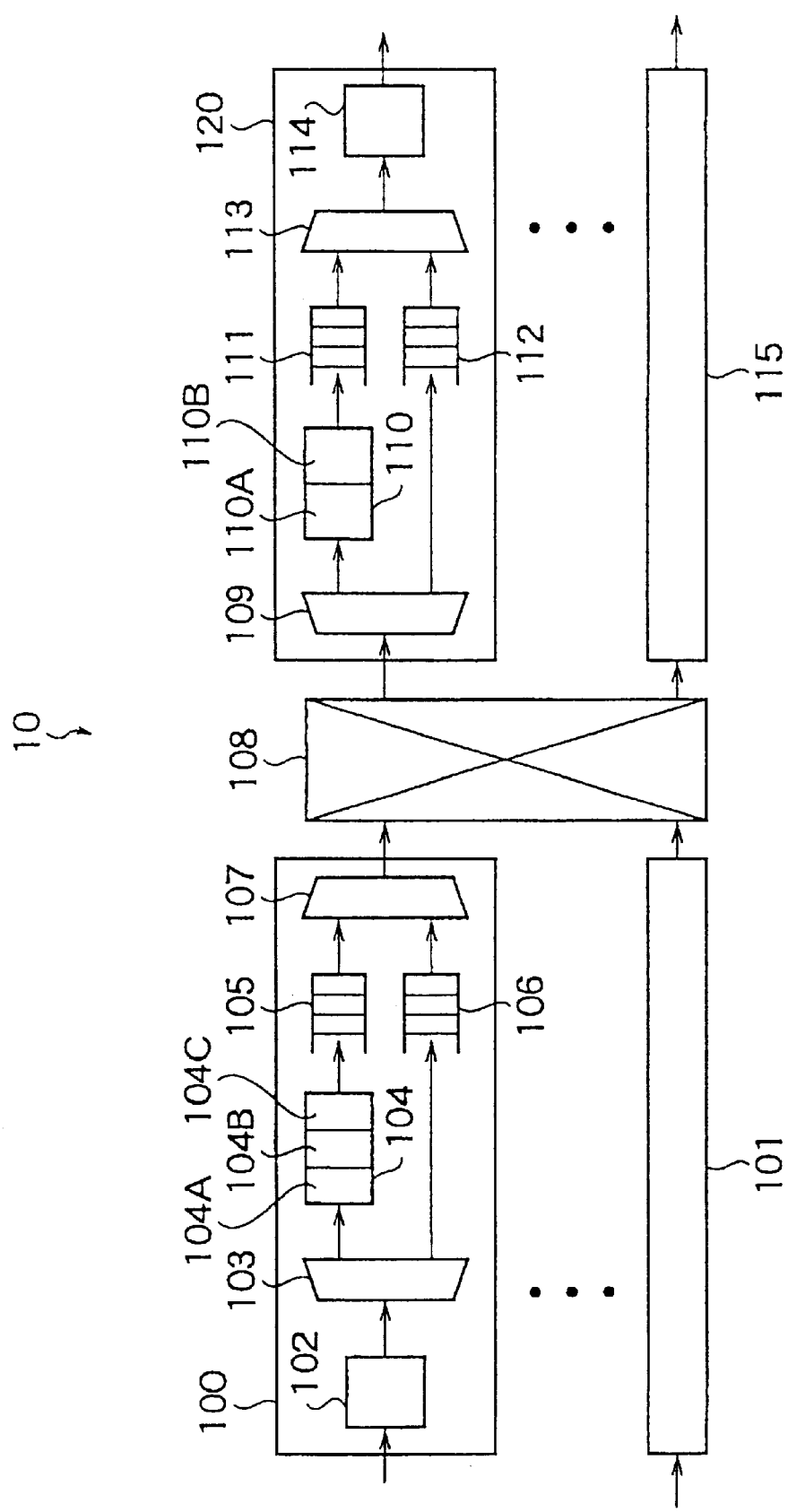
FIG. 1 is a block diagram showing the entire configuration of a conventional ATM switching apparatus.

The processing that said input ATM cell processing circuit 400 performs for an input ATM cell that does not include a CPS packet is the same as the processing that was typically carried out in the ATM switching system previous to a cell switching system 20 of FIG. 1.

The header converting table 403 is a memory means for storing the corresponding relationship between the header information of input ATM cells such as VPI and VCI, that is, the header information before header conversion and the header information after header conversion.

Said internal ATM cell header transmitting circuit 405 generates and outputs an internal ATM cell header, that is, a switching tag.

However, in the case where the control circuit 404 and the transmitted information selecting circuit 402 are going to transmit an in-switch ATM cell that includes a CPS packet, the internal ATM cell header transmitting circuit 405 generates and outputs not only a switching tag but also a header of said in-switch ATM cell.

ATM cells including ATM cell headers are stored in the buffer 410, however, only CPS packets are stored in the buffer 401 as no information regarding ATM cell headers exists. The entire length of a packet may be fixed (fixed to 54 bytes in this embodiment), thereby conveniently providing the ATM switch circuit 407 with a uniform operation.

These buffers 410 and 401 employ mainly the so-called FIFO system (a "First-In First-Out" memory).

The contents of the switching tag include switching information that is referred to when the ATM switch circuit 407 performs switching between internal ATM cells (in-switch ATM cells) and a CPS packet identifier that indicates whether said in-switch ATM cells contain a CPS packet in the payload portion thereof.

The switching tag is mainly used inside said ATM switching system and may be provided with any configuration so as to be suitable for internal processing of the ATM switching system 15. Therefore, the required number of bits is to be fixed depending on how said ATM switching system 15 is configured. In this embodiment, the switching tag has one byte.

Said input CPS packet buffer circuit 401 functions for transmitting the address information of CPS packets, the associated VPI and VCI information, and information regarding the length of CPS packets indicated in the CPS packet headers via the control circuit 404, in addition to functioning as a simple buffer for CPS packets.

Said pad pattern transmitting circuit 406 generates and outputs predetermined dot patterns. The dot pattern shows that an area having a pad pattern in the payload is a wasted region having no valid information.

Any pad pattern may be employed so long as machines can identify the pattern uniquely, for example, where such protocol is to be followed in that a pattern with all "0" is not allowed as a CID, the pad pattern may be all "0".

A start pattern is provided in a field (see FIG. 5A) in addition to the dot pattern in the ATM cell to be inputted to said ATM switching system 15 and the payload of the ATM cell to be transmitted from said ATM switching system 15 to the outside.

The start pattern is a pointer for designating uniquely the position where the first CPS packet header exists in a payload. Said start pattern is required because it is possible for one CPS packet to be mapped to the payload of a plurality of ATM cells.

In order to assemble an in-switch ATM cell of 54 bytes, the selector operation of said transmitted information selecting circuit 402, that is, the operation of selecting one of the four outputs at a time is repeated, the four outputs being from said buffer 401, said buffer 410, said internal ATM cell header transmitting circuit 405, and pad pattern transmitting circuit 406.

The control circuit 404 controls this selector operation under time control by means of the timer circuit 409, whereby in-switch ATM cells of 54 bytes are generated in sequence and transmitted from the output terminal 412 sequentially.

In addition, the input CPS packet buffer control circuit 408 controls the operation of the buffer 401 that temporarily stores respective CPS packets taken out of ATM cells in the input ATM cell processing circuit 400. Storing to the buffer 401 (writing) and reading from the buffer 401 must be carried out in units of CPS packets. Moreover, since CPS packets have a variable length, control different from that of the buffer 410 that stores fixed-length ATM cells is required.

The input CPS packet buffer control circuit 408 has a function for transmitting commands, at the time of said reading, regarding the assembling of an in-switch ATM cell that routes within the ATM switch circuit 407 to related portions especially to the input CPS packet buffer circuit 401 via the control circuit 404.

In more detail, the input CPS packet buffer control circuit 408 receives the destination information of CPS packets stored in the input CPS packet buffer circuit 401 and the associated VPI and VCI information via the control circuit 404, and then checks whether the same in-switch ATM cell can be filled with successive CPS packets.

Then, if the successive CPS packets have the same destination, and the same VPI and VCI, the input CPS packet buffer control circuit 408 calculates whether it is possible to bear those CPS packets on the same in-switch ATM cell payload portion. That is, the input CPS packet buffer control circuit 408 checks whether a plurality of successive CPS packets has the same destination and the same associated VPI and VCI, and whether the total length of those packets exceeds 48 bytes (the length of the payload of the ATM cell).

In the foregoing, the same destination indicates the same output port is used for transmission among all output ports of the ATM switch circuit 407 of said ATM switching system 15. Therefore, the destination is one uniquely identified output port among M output ports 10-1 through 10-M of FIG. 8. The CPS packets having the same destination are CPS packets having a commonality in the header information thereof and need not necessarily have the same distal terminal to which the packets will be finally placed.

Moreover, to have the same distal terminal to which the packets will be finally placed, for example, the associated VPI and VCI, and CID need to be the same and, if required, the physical line number (for identifying input ports) needs to be the same.

In addition, the associated VPI and VCI being the same indicates that the VPI and VCI for which the headers of input ATM cells inputted including the CPS packets have are the same. This "being the same" holds true in said ATM switching system 15 only from a local point of view.

The condition of the associated VPI and VCI being the same is added because of the necessity of information of VPI and VCI corresponding to respective CPS packets for processing in said output ports. This condition was not required for consideration in the aforementioned conventional cell switching system where one CPS packet was mapped to the payload within one in-switch-ATM cell.

Since associated VPI and VCI tend to output the same CPS packet successively in a node of the so-called IMT-2000 (a third generation telecommunications system), the frequency of packing a plurality of CPS packets into the same in-switch ATM cell would not be reduced significantly even when said VPI and VCI are added as a condition.

In cases where all conditions are met and a plurality of CPS packets are mapped to the payload-of one in-switch ATM cell, in accordance with the information used for calculating whether the total length of a plurality of successive CPS packets exceeds 48 bytes, the input CPS packet buffer control circuit 408 commands the control circuit 404 regarding the transmission (read) timing of CPS packets from the input CPS packet buffer circuit 401.

At this time, the input CPS packet buffer control circuit 408 provides the value of total length of the transmitted CPS packets together to the control circuit 404.

Furthermore, for the transmission timing of an in-switch ATM cell, in order to keep the delay time in the input CPS packet buffer circuit 401 within a certain period of time, said timer circuit 409 monitors time at all times and a notice based on this is received by the input CPS packet buffer control circuit 408 to reflect the same to the transmission timing of the in-switch ATM cell.

In the aforementioned FIG. 8, the ATM switch circuit 407 is provided, on the output side thereof, with M output ports 10-1 through 10-M, which are shown by being enclosed by a dashed line and each of which is coupled to output terminals 1 through M of the ATM switch circuit 407. Furthermore, said M is normally equal to said N.

Since each output port has substantially the same internal configuration, the output port 10-1 is explained here.

The output port 10-1 comprises an input terminal 450, an in-switch ATM cell terminating circuit 451, an output ATM cell processing circuit 452, an output terminal 453, a header converting table 454, and a control circuit 455.

Next, the relationship between the connections of these respective portions is explained.

Said input terminal 450 connects the ATM switch circuit 407 to the in-switch ATM cell terminating circuit 451. The in-switch ATM cell terminating circuit 451 is coupled to the output ATM cell processing circuit 452 as well as to the control circuit 455. The output ATM cell processing circuit 452 is coupled to the output terminal 453 as well as to the control circuit 455. The control circuit 455 is coupled to the header converting table 454 in addition to said connections.

Moreover, like said control circuit 404, the control circuit 455 is a processor arranged at each output port separately from a processor as a central processor of said ATM switching system 15.

In functional aspects, the in-switch ATM cell terminating circuit 451 has a function for determining whether said in-switch ATM cell includes a CPS packet by checking the CPS packet identifier written on the switching tag of an inputted in-switch ATM cell.

Furthermore, the in-switch ATM cell terminating circuit 451 takes individual CPS packets out of an in-switch ATM cell if the cell includes CPS packets, while it does not carry out the taking-out processing circuit of CPS packets if the cell does not include CPS packets but executes header conversion.

In this header conversion, the ATM header information of the inputted in-switch ATM cell (VPI/VCI values) and the header information (CID values) of respective CPS packets are transmitted to the header converting table 454 via the control circuit 455 to allow the CID value of the CPS packets to be converted. The CPS packets and ATM cell for which the header conversion has been completed in the in-switch ATM cell terminating circuit 451 are transmitted to the output ATM cell processing circuit 452.

The output ATM cell processing circuit 452 performs the AAL2 layer processing and the ATM layer processing for said CPS packets and ATM cell to transmit the CPS packets and ATM cell to the output terminal 453 as a standard 53-byte ATM cell.

The processing in this output ATM cell processing circuit 452 performs mapping of as many CPS packets as possible to the payload of one ATM cell. This is the same processing as that carried out in the output AAL2 processing circuit 110, buffers 111 and 112, the output ATM cell multiplexing circuit 113, and the output ATM cell header processing circuit 114 of the aforementioned conventional cell switching system 10.

The operation of the first embodiment having the aforementioned configuration is explained below.

Operation of the first embodiment

An ATM cell arriving, for example, at the input terminal 411 of FIG. 1 undergoes the aforementioned processing in the input ATM cell processing circuit 400. CPS packets are stored in the input CPS packet buffer circuit 401 and an ATM cell that does not include CPS packets is stored in the input cell buffer circuit 410.

The transmitted information selecting circuit 402 controlled by means of the control circuit 404, for example, in the case of transmitting an in-switch ATM cell that does not include a CPS packet, selects the internal ATM cell header transmitting circuit 405 for a period of time corresponding to one byte and the buffer 410 for a period of time corresponding to 53 bytes. An in-switch ATM cell is thereby assembled in which one-byte switching tag is attached to the head of a 53-byte ATM cell that does not include a CPS packet, and then supplied to the input terminal 1 of the ATM switch circuit 407 via the output terminal 412.

In the case of transmitting an in-switch ATM cell that includes a CPS packet, the transmitted information selecting circuit 402 selects the internal ATM cell header transmitting circuit 405 for a period of time corresponding to six bytes which is derived from 5 bytes of an in-switch ATM cell plus one byte of the switching tag thereof, and then is switched over to the buffer 401.

The period of time of the buffer 401 to be selected varies depending on how many and how long the CPS packets to be filled with in the payload of said in-switch ATM cell.

In the aforementioned example of a total length of 13 bytes that is derived from the 10 bytes of the information length of compressed voice employing CODEC by G.729 plus the 3 bytes of the CPS packet header, a total of three CPS packets having the same associated VPI and VCI, that is, CPS packets of 39 bytes can be packed into the payload of one in-switch ATM cell.

In this case, the period of time of said buffer 401 is the time corresponding to said 39 bytes.

The calculation as to how long and how many CPS packets to be filled (multiplexed) in the payload of an in-switch ATM cell is to be carried out by the control circuit 404 in advance, and the result of said calculation is to be stored in the input CPS packet buffer control circuit 408.

The period of time of the pad pattern transmitting circuit 406 to be subsequently selected varies depending on the period of time selected for said buffer 401. In the example of packing three CPS packets of 39 bytes, the length of the pad pattern is equal to 9 (=48−39) and the period of time to be selected is to be the time corresponding to said 9 bytes.

At the time of completion of the selected period of time corresponding to the 9 bytes, the in-switch ATM cell of 54 bytes that includes three CPS packets of 39 bytes is transmitted from the output terminal 412 to the transmission path leading to the input terminal 1 of the ATM switch circuit 407 after being assembled.

The configuration of said in-switch ATM cell is just like the ATM cell of FIG. 5A, which is to be described later, from which the start pattern is removed and to the head of which the 1-byte switching tag is attached.

Next, in the case where, of a series of operations, an inputted ATM cell includes a plurality of CPS packets, the operation of the portion where said plurality of CPS packets are filled in different in-switch ATM cells by the destination, and by the associated VPI and VCI will be explained with reference to FIG. 5A through FIG. 5C. This operation is mainly carried out by the input CPS packet buffer control circuit 408.

Figure 5A:
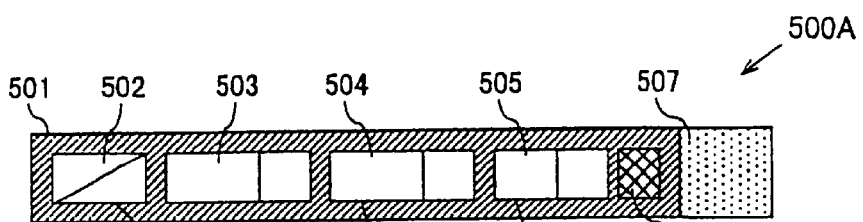
FIGS. 5A through 5C are explanatory diagrams of the operation of the first through third embodiments of the ATM switching system according to the invention.

In FIG. 5A, an ATM cell 500A that has been supplied from the outside to said input ATM cell processing circuit 400 and has not been provided with any processing by means of the processing circuit 400 comprises an ATM cell header 507 and an ATM cell payload 501.

Among them, the payload 501 comprises a start pattern (start field) 506, three CPS packets 503–504, and a pad pattern (pad field) 502.

The three CPS packets of the CPS packet 505, the CPS packet 504, and the CPS packet 503 are arranged in the payload 501 in that order from the side near the head header 507.

Accordingly, they are stored in the buffer 401 in that order and read in that order as well.

Since they are filled and inputted in the same ATM cell 500A, the same VPI and VCI that the ATM cell header 507 has corresponds to these three CPS packets and the condition wherein the associated VPI and VCI should be the same is satisfied.

Moreover, in FIG. 5A, all fields of the payload 501 of 48 bytes correspond to any one of the start pattern 506, three CPS packets 503–505, and the pad pattern 502, without exception. In this respect, the same holds true for FIG. 5B and FIG. 5C, and the payload of other in-switch ATM cells.

Figure 5B:
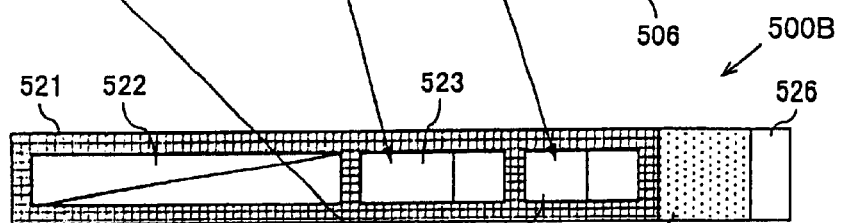
Figure 5C:
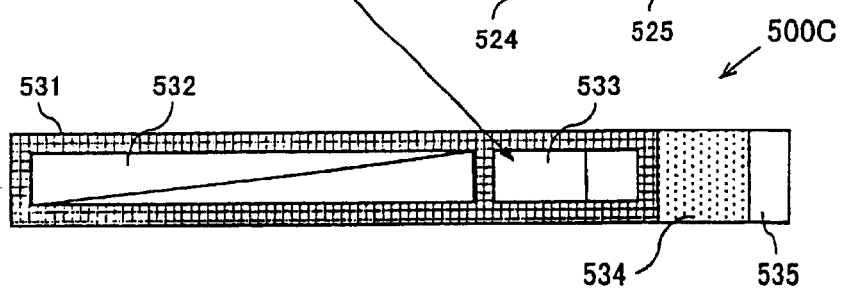

FIG. 5B and FIG. 5C show an in-switch ATM cell on the transmission path directed from the output terminal 412 of the transmitted information selecting circuit 402 to the input terminal 1 of the ATM switch circuit 407.

In FIG. 5B, an in-switch ATM cell 500B comprises a switching tag 526, an ATM cell header 525, and an ATM cell payload 521.

Among them, the payload 521 comprises two CPS packets 523 and 524 and a pad pattern 522. The CPS packets are arranged so that the CPS packet 524 comes first and the CPS packet 523 comes next.

In addition, in FIG. 5C, an in-switch ATM cell 500C comprises a switching tag 535, an ATM cell header 534, and an ATM cell payload 531.

Among them, the payload 531 comprises one CPS packet 533 and a pad pattern 532.

The in-switch ATM cell 500B of FIG. 5B is first transmitted and then the in-switch ATM cell 500C of FIG. 5C is transmitted from the output terminal 412 in that order.

In the foregoing, it is assumed that, in the relationship between ATM cells 500A, 500B, and 500C, two in-switch ATM cells 500B and 500C are generated corresponding to one inputted ATM cell 500A. Then, the corresponding relationship between the CPS packets that are included by respective ATM cells is as shown by the arrows in FIGS. 5A through 5C.

That is, the first CPS packet 524 in the payload 521 of the first in-switch ATM cell 500B corresponds to the first CPS packet 505 in the payload 501 of the ATM cell 500A. The second CPS packet 523 corresponds to the second CPS packet 504 in the payload 501 of the ATM cell 500A. In addition, the CPS packet 533 in the payload 531 of the subsequent in-switch ATM cell 500C corresponds to the third CPS packet 503 in the payload 501 of said ATM cell 500A.

In this case, the two CPS packets 524 and 523 that the in-switch ATM cell 500B includes have the same destination, while one CPS packet that the in-switch ATM cell 500C includes has a destination different from that of the CPS packets 524 and 523. Since CPS packets having the same VPI and VCI but a different destination cannot be packed in the same in-switch ATM cell, the CPS packets are distributed in this way.

The operation is as follows for generating and outputting two in-switch ATM cells 500B and 500C, corresponding to the input of one ATM cell 500A.

First, as a result of the processing of the input ATM cell processing circuit 400 corresponding to the ATM cell 500A, the three CPS packets are stored in the buffer 401 according to the sequence in the payload 501.

Then, at the time of generating the in-switch ATM cell 500B, the period of time to be selected for the buffer 401 of the transmitted information selecting circuit 402 is the period of time corresponding to the two CPS packets 524 and 523. After the selection, the pad pattern transmitting circuit 406 is selected to form the pad pattern 522 and then the generation of the in-switch ATM cell 500B is completed.

Subsequently, the transmitted information selecting circuit 402 selects the internal ATM cell header transmitting circuit 405 in order to form the switching tag 535 and the ATM cell header 534 of the in-switch ATM cell 500C. Hereinafter the operations that have been described are performed and thus the assembly of in-switch ATM cell 500C is completed.

Then, first the in-switch ATM cell 500B and then the in-switch ATM cell 500C are supplied to the input terminal 1 of the ATM switch circuit 407, each being switched (routed) in the ATM switch circuit 407.

Furthermore, in this example, of the three CPS packets that the ATM cell 500A includes, the first CPS packet 505 and the second CPS packet 504 have the same destination information and the same associated VPI and VCI, and were packed into the same first in-switch ATM cell 500B. However, if the second CPS packet 504 and the third CPS packet 503 had the same destination and the same associated VPI and VCI, then the two CPS packets of the second CPS packet 504 and the third CPS packet 503 were to be packed into the second in-switch ATM cell 500C.

In addition, if the first CPS packet 505, the second CPS packet 504, and the third CPS packet 503 have the same destination and associated VPI and VCI, then these three are to be included in the same in-switch ATM cell. Accordingly, the difference in configuration between an inputted ATM cell and the in-switch ATM cell corresponding to this ATM cell is substantially the presence of the switching tag (other than the conversion of the VPI and VCI).

Furthermore, if even a pair of the same CPS packets having the same destination are not found among the three CPS packets 505 through 503, each one of the packets is naturally mapped into a separate in-switch ATM cell and thus three in-switch ATM cells are to be assembled.

Furthermore, if the first CPS packet 505 and the third CPS packet 503 have the same destination information, each one of the first CPS packet 505, the second CPS packet 504, and the third CPS packet 503 is individually mapped into a separate in-switch ATM cell. This is because this embodiment has no such means that allows for excluding only the second CPS packet 504, and packing only the first CPS packet 505 and the CPS packet 503 into one in-switch ATM cell.

Still furthermore, in the aforementioned example, only one cell, the ATM cell 500A, was inputted. However, where a plurality of ATM cells 500A is inputted, an identical operation can be performed.

A plurality of CPS packets that are included in the payload of a plurality of inputted in-switch ATM cells can be handled by combining any one of the cases described in the aforementioned examples and by paying attention only to the flow of CPS packets that are inputted in time sequence irrespective of whether the inputted ATM cells were the same.

On the other hand, the operation of the output side is substantially the same as the operation of the output ATM cell processing circuits 120 of the conventional cell switching system 10 that has been already explained.

That is, an in-switch ATM cell that arrives from the ATM switch circuit 407 is inputted to the in-switch ATM cell terminating circuit 451 via the input terminal 450 to undergo processing. Then, the in-switch ATM cell undergoes processing in the output ATM cell processing circuit 452 to be transmitted to the outside from the output terminal 453.

In the processing of the output ATM cell processing circuit 452, such a configuration as one like said ATM cell 500A is formed.

That is, it is checked whether a plurality of CPS packets that have arrived at the output ATM cell processing circuit 452 via the input terminal 1 of the ATM switch circuit 407 can be packed into the payload of one ATM cell, that is, the CPS packets are less than 47 (=48−1) bytes that are obtained by subtracting 1 byte of the start pattern from the payload. If the packets can be packed, as many CPS packets as possible are filled in one ATM cell, whereby an ATM cell, for example, the ATM cell 500A is formed.

Effect of the First Embodiment

As described in the foregoing, according to this embodiment, compared with the case where CPS packets are individually inserted into the payload of an in-switch ATM cell, the processing efficiency before and after the ATM switch circuit 407 is improved and the number of CPS packets that can be switched in unit time is increased, and thus the switching capacitance is increased.

That is, in this embodiment, full use may be efficiently made the resources of an ATM switching system.

For example, in the aforementioned example of a length of 10 bytes of information employing CODEC by G.729 with 3 bytes of a CPS packet header, according to the embodiment, said three CPS packets are packed into the payload of an in-switch ATM cell, so that the wasted region becomes 9 bytes (=48−13×3). This has been reduced to approximately a quarter of the 35 bytes of the conventional wasted region.

Second Embodiment

In this embodiment, means are provided that allows for excluding only the second CPS packet 504 and packing only the first CPS packet 505 and the third CPS packet 503 into one in-switch ATM cell when the first (CPS packet) 505 and the third CPS packet 503 have the same destination information, which was described in the first embodiment.

In the first embodiment, to cope with this case, either each one of the first CPS packet 505, the second CPS packet 504, and the third CPS packet 503 is mapped into a separate in-switch ATM cell, or all the three CPS packets 505 through 503 are mapped to one in-switch ATM cell.

Mapping each one of them to a separate in-switch ATM cell sacrifices the switching capacity.

In addition, mapping all three CPS packets 505 through 503 onto one in-switch ATM cell causes disadvantages such as a decrease to the service efficiency of the hardware of N×M ATM switch circuits and a plurality of output ports, of which are much is expected.

This embodiment can eliminate such disadvantages.

That is, this embodiment is characterized in that CPS packets having the same destination and the same associated VPI and VCI can be filled in the payload of one in-switch ATM cell even if the packets are not successive.

Figure 6:
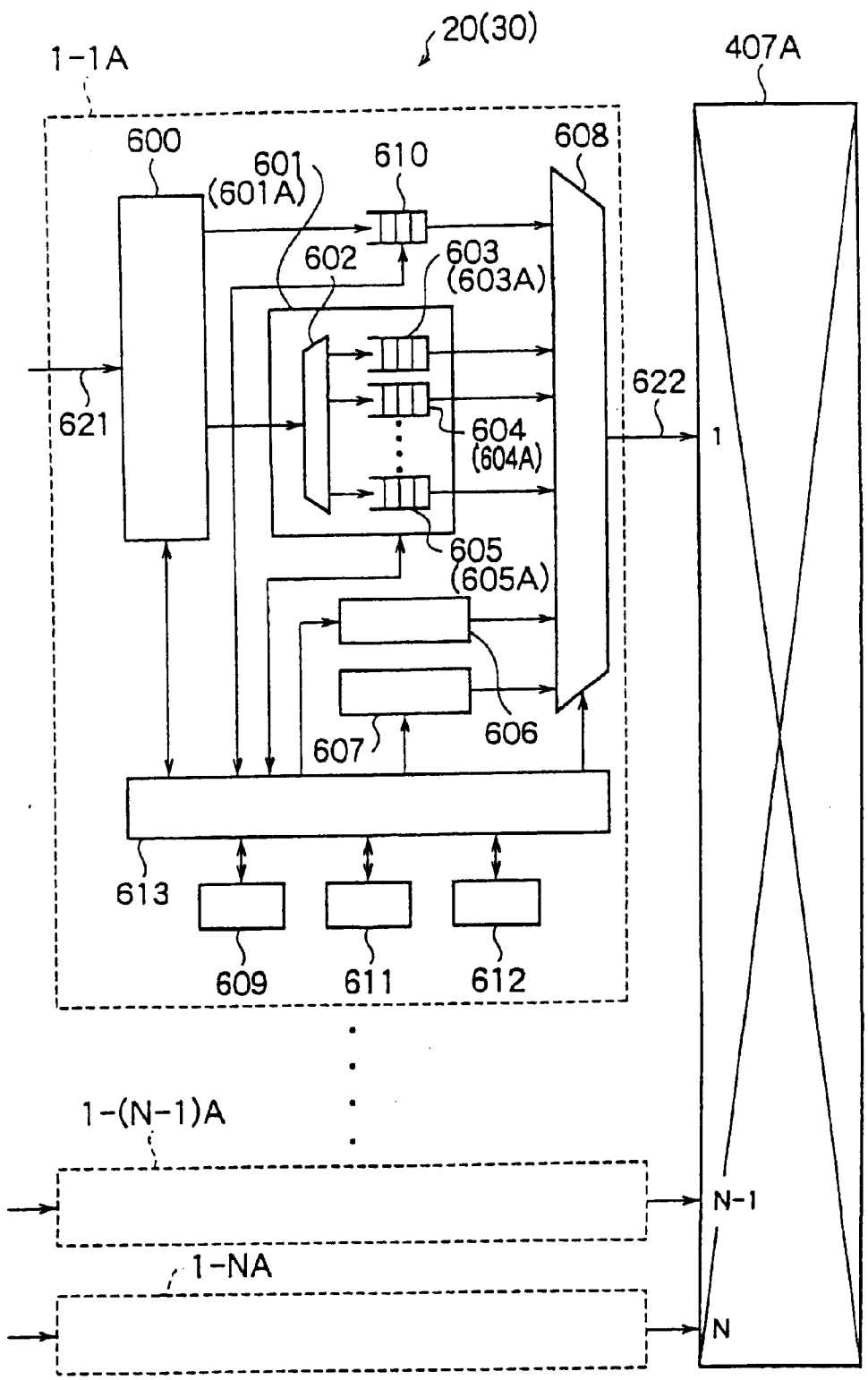
FIG. 6 is an explanatory block diagram showing the configuration of the input side of an ATM switching system according to second and third embodiments.

Configuration and operation of the second embodiment In the configuration of the ATM switching system 20 of this embodiment, the input side is the same as that of FIG. 1 as shown in FIG. 6 and the output side is completely the same as that of FIG. 8.

However, this embodiment is different from the first embodiment in the internal configuration of each input port, having the configuration shown in FIG. 6.

Since respective input ports of this embodiment have substantially the same internal configuration, FIG. 6 shows the internal configuration of only an input port 1-1A. The input port 1-1A corresponds to said input port 1-1.

In FIG. 6, the input port 1-1A comprises an input ATM cell processing circuit 600, an in-switch cell assembling circuit 601, an internal ATM cell header transmitting circuit 606, a pad pattern transmitting circuit 607, a transmitted information selecting circuit 608, a header converting table 609, an input cell buffer circuit 610, a timer circuit 611, an input CPS packet buffer control circuit 612, a control circuit 613, an input terminal 621, and an output terminal 622.

Among them, the input ATM cell processing circuit 600 corresponds to said input ATM cell processing circuit 400, the internal ATM cell header transmitting circuit 606 corresponds to said internal ATM cell header transmitting circuit 405, the pad pattern transmitting circuit 607 corresponds to said pad pattern transmitting circuit 406, the transmitted information selecting circuit 608 corresponds to said transmitted information selecting circuit 402, the header converting table 609 corresponds to said header converting table 403, the input cell buffer circuit 610 corresponds to said input cell buffer circuit 410, the timer circuit 611 corresponds to said timer circuit 409, the input CPS packet buffer control circuit 612 corresponds to the input CPS packet buffer control circuit 408, the control circuit 613 corresponds to said control circuit 404, the input terminal 621 corresponds to said input terminal 411, and the output terminal 622 corresponds to said output terminal 412, and therefore these are not explained in detail.

Said in-switch cell assembling circuit 601 is provided, inside thereof, with an input CPS packet allocating circuit 602 and X input CPS packet buffer circuit (1) 603 through (X) 605.

After the input ATM cell processing circuit 600 determines whether an ATM cell inputted through the input terminal 621 includes a CPS packet, an ATM cell that does not include a CPS packet is stored in the input cell buffer circuit 610.

An ATM that includes CPS packets undergoes processing up to the AAL layer in the input ATM cell processing circuit 600 and then individual CPS packets are taken out thereof.

The taken-out CPS packets are transmitted to the in-switch cell assembling circuit 601 in conjunction with the destination information and associated VPI and VCI information of individual CPS packets.

At this time, the destination of individual CPS packets is determined uniquely by CID (Channel ID=CPS Packet Identifier) that is included in the VPI/VCI value and CPS packet header, and the information is stored in the header converting table 609. Moreover, at this time, as required, the CID undergoes rewriting operation like the VPI/VCI values of the ATM layer undergoing conversion.

The in-switch cell assembling circuit 601 allows the input CPS packet allocating circuit 602 to allocate the CPS packets, based on the destination information of the input CPS packets and by the destination of a CPS packet, to the input CPS packet buffer circuit (1) 603 through input CPS packet buffer circuit (X) 605.

Since the CPS packets are allocated by the destination, all CPS packets stored in the same input CPS packet buffer circuit are to aim at the same destination. That is, if the associated VPI and VCI are the same, it is possible to carry packets to the payload of the same in-switch ATM cell for routing.

It is assumed that the number X of the CPS packet buffer circuits is equal to the number of destinations. The number of destinations refers to the number of output ports of the ATM switch circuit 407A. Since the ATM switch circuit 407A is completely the same as said ATM switch circuit 407 and has said N_M configuration, said number of output ports is equal to said M.

After the CPS packets are allocated to and stored in the input CPS packet buffer circuit (1) 603 through (X) 605, the destination information and associated VPI and VCI information of respective CPS packets and the information on the length of the CPS packets indicated in the CPS packet headers are transmitted to the input CPS packet buffer control circuit 612 via the control circuit 613.

Unlike said input CPS packet buffer control circuit 408 that controls only one buffer 401, the input CPS packet buffer control circuit 612 must control the status of the X input CPS packet buffer circuit (1) 603 through (X) 605. As for other respects, the operation of the input CPS packet buffer control circuit 612 is the same as that of the input CPS packet buffer control circuit 408.

In this embodiment, the transmitted information selecting circuit 608 that is controlled by the control circuit 613 performs switching among the X buffers 603 through 605, the internal ATM cell header transmitting circuit 606, and the pad pattern transmitting circuit 607, whereby in-switch ATM cells are assembled.

This operation is explained with reference to FIG. 7.

Figure 7:
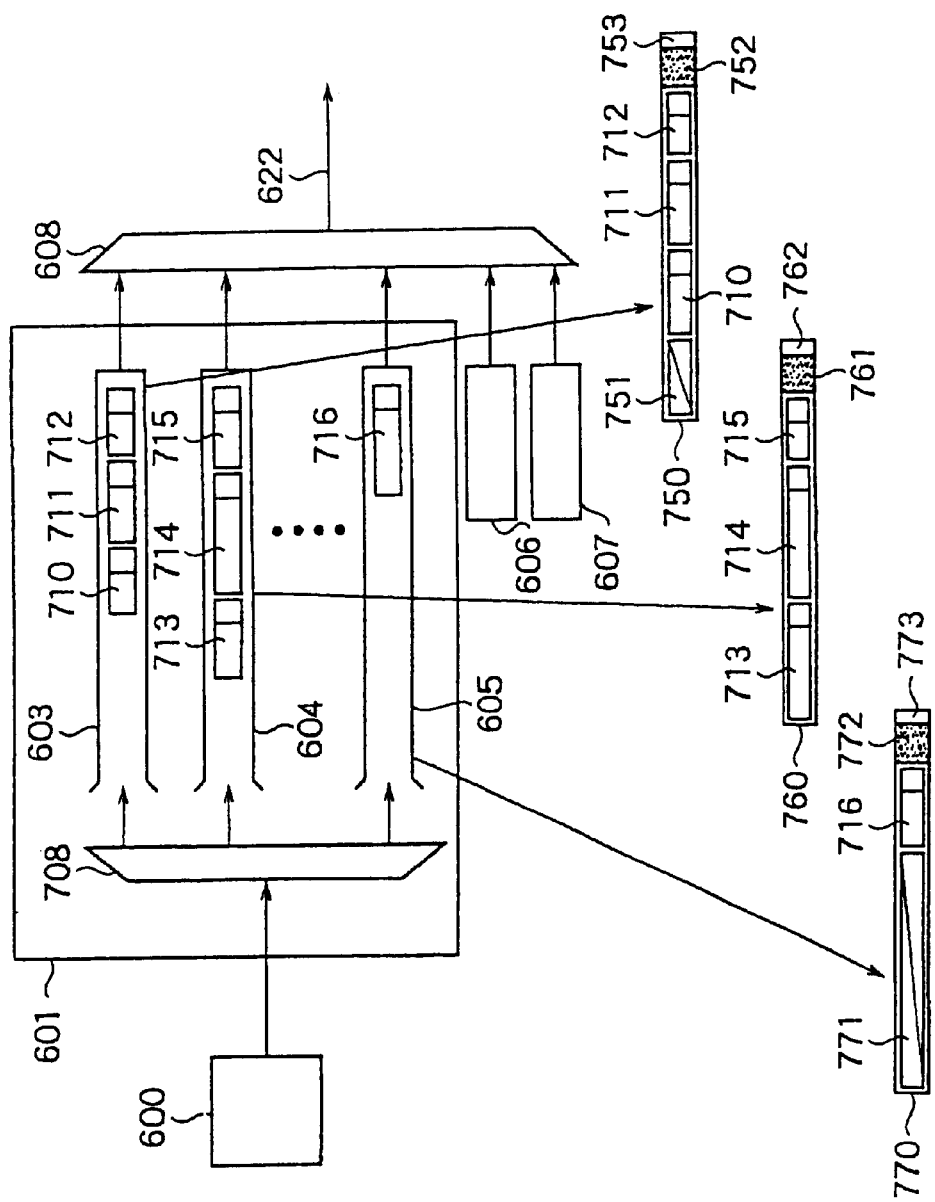
FIG. 7 is an explanatory diagram of the operation of the second and third embodiments of the ATM switching apparatus according to the invention.

Referring to FIG. 7, a CPS packet 712 is stored first in the buffer 603, and subsequently CPS packets 711, 710 are stored.

Likewise, CPS packets 715, 714, 713 are stored in the buffer 604 in that order and a CPS packet 716 is stored in the buffer 605.

Referring to FIG. 7, an in-switch ATM cell 750 has a switching tag 753 and an in-switch ATM cell header 752. Three CPS packets, that is, CPS packets 712, 711, 710 are stored in the payload thereof in that order and a pad pattern 751 is placed at the end.

Likewise, an in-switch ATM cell 760 comprises a switching tag 762, an in-switch ATM cell header 761, the CPS packets 715, 714, 713 in that order, while in-switch ATM cell 770 comprises a switching tag 773, an in-switch ATM cell header 772, the CPS packet 716, and a pad pattern 771 in that order.

Incidentally, the total packet length of the three CPS packets 715 to 713 of the in-switch ATM cell 760 is just equal to 48 bytes, an example of obviating the need for inserting a pad field. At the time of assembling said in-switch ATM cell 760, the transmitted information selecting circuit 608 needs not select the pad pattern transmitting circuit 607 at the end.

In order to assemble said in-switch ATM cell 750 on the transmission path leading from the output terminal 622 to the input terminal 1 of the ATM switch circuit 407A, the transmitted information selecting circuit 608 selects and switches among an internal ATM cell header transmitting circuit 703, the buffer 603, and a dot pattern transmitting circuit 704 in that order. The period of time selected for said buffer 603 is to be the time during which the three CPS packets 712 to 712 can be read successively.

The assembly of the in-switch ATM cells 760, 770 is carried out substantially in the same manner. In the case of the in-switch ATM cell 760, the CPS packets 715, 714 are to be read out in a period of time selected for the buffer 604, while one CPS packet 716 is to be read out in a period of time selected for the buffer 605 in the case of the in-switch ATM cell 770. The period of time selected for the pad pattern transmitting circuit 607 should vary depending of the period of time selected for the buffer.

It is obvious that such input port 1-1A can generate all the in-switch ATM cells that the input port 1-1 of the first embodiment can assemble.

In addition, the input port 1-1A can generate an in-switch ATM cell of a configuration that the input port 1-1 cannot assemble.

That is, in the case where, in the aforementioned ATM cell 500A of FIG. 5A, the first CPS packet 505 and the third CPS packet 503 have the same destination information but only the second CPS packet 504 has a different one, it is possible to exclude the second CPS packet 504, and pack only the first CPS packet 505 and the third CPS packet 503 into one in-switch ATM cell since CPS packets are stored by the destination in respective buffers 603 through 605.

This is because, if the first CPS packet 505 and the third CPS packet 503 have the same destination and the second CPS packet has a different one in the ATM cell 500A, the first and third CPS packets 505, 503 are stored into a corresponding buffer in that order and only the second CPS packet 504 is stored in a buffer different from said buffer. In addition, this is also because the CPS packet 505 and the CPS packet 503 should have the same associated VPI and VCI since they are included in the same ATM cell 500A.

For example, it is assumed that the first and third CPS packets 505, 503 are stored in the buffer 604 and the second CPS packet 504 is stored in the buffer 605. The CPS packet 715 that the in-switch ATM cell 760 includes would correspond to said first CPS packet 505, while the CPS packet 714 would correspond to said third CPS packet 503. Moreover, said second CPS packet 504 would correspond to the CPS packet 716 that the in-switch ATM cell 770 includes.

In this case, however, the last CPS packet 713 of the in-switch ATM cell 760 corresponds to the CPS packet that the ATM cell includes which is inputted externally after the input ATM cell 500A.

Incidentally, since the configuration and the function of the output ports of the ATM switching system 20 are completely the same as the output port 10-1 and the like of the firs embodiment shown in FIG. 8, its explanation is omitted.

As described in the foregoing, this embodiment can provide the same effect as that provided by the first embodiment.

In addition, even in the aforementioned case where, for example, the first CPS packet 505 and the third CPS packet 503 have the same destination in the ATM cell 500A and only the second CPS packet has a different destination, that is, CPS packets do not have the same destination in succession; this embodiment makes it possible to pack CPS packets having the same destination into the payload of one in-switch ATM cell if the packets have the same associated VPI and VCI.

This embodiment thereby prevents disadvantages of switching capacitance that the first embodiment has and a decrease in service efficiency of the resources of the ATM switching system such as the hardware of N_M ATM switch circuits and a plurality of output ports.

That is, this embodiment provides much greater switching capacitance and much higher service efficiency of resources of the ATM switching system than the first embodiment.

Third Embodiment

In the second embodiment, an input CPS packet buffer circuit is provided for each destination. This embodiment is characterized by preparing a separate buffer by QoS (Quality of Service) among the same destinations.

Configuration and operation of the third embodiment Since the configuration of both input and output sides of an ATM switching system 30, according to this embodiment, is the same as that of the ATM switching system 20 according to the second embodiment, FIG. 6 and FIG. 8 are used for explanation of this embodiment. However, since the ATM switching system 30 is different from the ATM switching system 20, according to the second embodiment, from the technical point of view, a different reference numeral 30 is attached thereto for differentiation.

Likewise, different reference numerals are attached to those components that characterize this embodiment compared with the second embodiment in order to differentiate the components from those of the second embodiment corresponding to the components.

That is, in FIG. 6, the in-switch cell assembling circuit of the ATM switching system 30, according to this embodiment, is attached with reference numeral 601A and respective input CPS packet buffer circuits are attached with reference numerals 603A through 605A.

The in-switch cell assembling circuit 601A corresponds to said in-switch cell assembling circuit 601, the buffer 603A corresponds to said buffer 603, the buffer 604A corresponds to said buffer 604, and the buffer 605A corresponds to said buffer 605.

Next, the technical differences between them are explained.

In the second embodiment, the input CPS packet buffer circuits 603 to 605 in the in-switch cell assembling circuit 601 have a configuration of being arranged for each of the destination ports (output ports) of the ATM switching system. (The arrangement of the input CPS packet buffer circuits mentioned herein is not limited to the physical arrangement but includes a method of logical arrangement therein.)

In contrast, the third embodiment has a configuration to even provide for CPS packets that aim at the same destination port with input CPS packet buffer circuits according to the difference in QoS (Quality of Service).

In the case where CPS packets that aim at the same destination output port have different QoS, for example, some CPS packets have strict conditions and other CPS packets have reduced conditions concerning delay time, whereby it is difficult in the second embodiment to handle the CPS packets differently since the CPS packets are stored in the same buffer.

However, in this embodiment, since CPS packets having different types of QoS even with the same destination are stored in different buffers in the assembling circuit 601A, it is easy to handle the CPS packets differently.

It is likely to occur that the number of buffers 603A through 605A, according to this embodiment, is greater than that of the buffers 603 through 605, according to the second embodiment, when buffers are mounted. However, the number is determined based on how many types of QoS classes to be controlled by means of the switching system 30.

In the cases where the types of QoS classes for all destinations is divided into two types of classes, namely, a class having a strict condition for delay time and a class having a reduced condition for delay time, the total number of input CPS packet buffer circuits 603A through 605A is equal to "the number of destination output ports" multiplied by 2. Since the number of output ports is also equal to M as shown in FIG. 8 in the switching system 30 according to this embodiment, the total number of buffers 603A through 605A is equal to 2M. This corresponds to twice the total number of buffers 603 through 605.

In other words, in this embodiment, one input CPS packet buffer circuit is identified only by identifying the destination information and QoS class information.

Furthermore, the switching system 30, according to this embodiment, allows the information on the QoS class of individual CPS packets to be stored in the header converting table 609 in conjunction with the destination information uniquely determined by said VPI and VCI, and CID, and the information of the associated VPI and VCI.

The processing to be carried out at the input ATM cell processing circuit 600 until and after the information on the QoS class is obtained is the same as that carried out in the second embodiment.

The input CPS packet allocating circuit 602 of the in-switch cell assembling circuit 601 that receives CPS packets supplied by the input ATM cell processing circuit 600 allocates respective CPS packets to said 2M buffers 603A through 605A according to the destination and QoS class thereof.

The input CPS packet buffer control circuit 612 or the control circuit 613 of this embodiment reinterprets, for example, the class having a strict condition on said delay time as the class having short delay time for assembling in-switch ATM cells and the class having a reduced condition on said delay time as the class having long delay time for assembling in-switch ATM cells, and thereafter allows these lengths of the assembly delay time to be defined and set for respective input CPS packet buffer circuits.

Then, when the traffic density becomes higher under actual service conditions, a higher priority is given to input CPS packet buffer circuits with short assembly delay time than to input CPS packet buffer circuits with long assembly delay time to be controllably read out.

Furthermore, for the input CPS packet buffer circuits to which short assembly time is set, the in-switch ATM cell assembly time that is limited by means of timer circuit 611 is also made shorter than others concerning the setting time and thus the delay time is controlled.

Operations except for those shown herein are the same as those of the second embodiment.

In this embodiment, the conditions required for CPS packets to be filled in one in-switch ATM cell are three, namely, the same destination, the same service class, and the same associated VPI and VCI.

Moreover, the types of QoS classes to be supported may be naturally more than those of said two classes, however, the number of QoS classes needs not be the same in all destinations. A configuration is also possible that has, for example, output ports having two classes of QoS and those having one class at the same time.

In this case, such a configuration is also possible for the buffers 603A to 605A housed in the assembling circuit 601A that allows, for example, two buffers corresponding to the output port 10-1 to be provided corresponding to two classes and one buffer corresponding to the output port 10-M to be provided corresponding to one class.

Effects of the Third Embodiment

As described above, this embodiment completely provides the same effects as those provided by the second embodiment.

In addition, this embodiment allows for controlling extensively QoS and the like in the switching operation of CPS packets, thus providing a highly reliable ATM switching system that supports attentive service in a flexible manner.

Additional Embodiment(s)

The processing equivalent to the aforementioned first embodiment can be implemented, for example, by using the same hardware as that of the conventional cell switching system 10 shown in FIG. 2 with the software thereof changed.

In contrast to the conventional mapping of one CPS packet to the payload of one in-switch ATM cell, as many CPS packets as possible may be preferably mapped to the payload of one in-switch ATM cell in accordance with the length of the associated CPS packets.

Moreover, the present invention allows for handling, using said start pattern, and the case where one CPS packet is extended over and mapped to the payload of a plurality of ATM cells.

Furthermore, in the first through third embodiments, at the time of packing a plurality of CPS packets to one in-switch ATM cell, a condition of the associated VPI and VCI being the same has been set, however, the present invention allows a configuration which does not employ such condition.

For example, one configuration is such that an information field is added (external addition), in addition to a 53-byte ATM cell and a switching tag and as a component of the in-switch ATM cell, to write therein the VPI and VCI information corresponding to the CPS packets packed in said in-switch ATM cell.

An example of the in-switch ATM cell of the external addition is shown in FIG. 9A.

In FIG. 9A, an in-switch ATM cell 900A comprises information fields PC1 (905), PC2 (906), and PC3 (907) for storing VPI and VCI between the ATM header AH908 and the switching tag ST of 1 byte, in addition to a configuration having an ATM cell of 53 bytes comprising a payload PL of 48 bytes and an ATM header AH908 of 5 bytes.

Additionally, the payload PL of said in-switch ATM cell 900A includes three CPS packets 901 through 903 (CH denotes the CPS packet header) therein.

For example, the information fields PC1 may have VPI and VCI corresponding to the CPS packet 901, the information fields PC2 may have VPI and VCI corresponding to the CPS packet 902, and the information fields PC3 may have VPI and VCI corresponding to the CPS packet 903.

However, the corresponding relationship between said PC1 to PC3 and CPS packets 901 to 903 is not limited thereto. For example, the PC1 may possibly be configured to have VPI and VCI corresponding to the CPS packet 903, the PC2 may possibly be configured to have VPI and VCI corresponding to the CPS packet 902, and the PC3 may be possibly configured to have VPI and VCI corresponding to the CPS packet 901.

In addition, the locations of the PC1 through PC3 are not limited to the example shown in the figure, but may be possibly arranged in front of the switching tag ST or behind the payload PL. Furthermore, four or more information fields that are the same as PC1 through PC3 may be added to one in-switch ATM cell 900A.

Moreover, in this example, an ATM header 908 is not made use thereof but may be designed so as to write therein the VPI and VCI corresponding to one CPS packet to be packed in said payload PL as a routing bit of the ATM header 908, whereby the in-switch ATM cell 900A can ensure four information fields in total to write VPI and VCI therein.

Consequently, in the in-switch ATM cell 900A, the output port is allowed to repack CPS packets referring to the VPI and VCI in the information field, even if four CPS packets are packed in the payload PL at maximum.

Even a CPS packet that has been included in the same in-switch ATM cell at the input port and thereafter switched to be transmitted to the output port can be packed into a different ATM cell by this packing. Then, this ATM cell is transmitted to the outside of the ATM switching system.

Another example of not employing the associated VPI and VCI as being the same is that said information field is not added to the outside as such but is set inside the payload of an ATM cell (internal addition).

An example of an in-switch ATM cell of the internal addition is shown in FIG. 9B.

In FIG. 9B, an in-switch ATM cell 900B has only a configuration of having an ATM cell of 53 bytes, which comprises a payload PL of 48 bytes and an ATM header AH913 of 5 bytes, plus a switching tag ST of 1 byte.

Therefore, the length and the dimensional configurations of the in-switch ATM cell 900B are the same as those of the in-switch ATM cell employed in the first through the third embodiments.

A PC1 (914) and a PC2 (915) that are included in the payload PL1 of the in-switch ATM cell 900B are information fields corresponding to the PC1 (905) and the PC2 (906) of said in-switch ATM cell 900A.

The VPI and VCI corresponding to the CPS packets 910, 911 that are included in the payload PL1 are stored in the PC1 (914) and the PC2 (915).

Three information fields become available by making use of the routing bit of an ATM header 913 and thus the in-switch ATM cell 900B becomes capable of including three CPS packets at maximum.

In addition, this embodiment is the same as the in-switch ATM cell 900A in that the location of the PC1 (914) and the PC2 (915) (may be arranged anywhere in the payload PL1), the number thereof, and the corresponding relationship with CPS packets are not limited to the example shown in the figure.

The internal addition has a more advantageous aspects than the external addition in that the number of information fields can be increased or decreased in response to the length and the number of the CPS packets that are included in the in-switch ATM cell 900B, however, such processing may possibly apply a heavy load to the input port.

An increase in the length of the in-switch ATM cell causes the switching capacity to be reduced by that amount in the case of the external addition, while part of the payload for accommodating CPS packets is occupied by information fields in the case of the internal addition, thereby reducing the switching capacity.

In addition, the ATM switch circuit conveniently processes in-switch ATM cells always having the same length. Accordingly, in the case of the external addition, the same amount of information fields is always added as that in the case where the number of the CPS packets accommodated in the payload of one in-switch ATM cell is maximum, thereby reducing the switching capacity in this respect.

The shortest CPS packet in length can have 4 bytes. Twelve CPS-packets at maximum, each having 4 bytes, can be packed in the payload of one in-switch ATM cell. However, always adding 12 information fields would cause a significant decrease in switching capacity. Accordingly, the external addition may be advantageously employed under the situation where the minimum value of the length of a CPS packet is limited, for example, to 13 bytes.

Consequently, concerning the external addition and the internal addition, such a decrease in switching capacity becomes conspicuous only when compared with the first to the third embodiments. Comparison with a conventional cell switching system shows that high switching capacity may be achieved by means of the external addition and the internal addition in either case.

Furthermore, in the first to the third embodiments, like the IMT-2000, such a prerequisite in that a node adjacent to said ATM switching system 15 (20, 30) in a network has a tendency to output ATM cells having the same VPI and VCI successively would result in high switching capacity. However, without such a prerequisite, the external addition or the internal addition may possibly provide higher switching capacity.

On the other hand, in the first through the third embodiments, an explanation of an example of the ATM communications in which ATM cells include CPS packets has been provided. However, it is not an essential condition in the present invention that a packet that includes a packet is a fixed-length packet like an ATM cell. It is not an essential condition either that a packet that includes a packet is a variable-length packet like a CPS packet.

The present invention can be widely applied to switching apparatuses for communications where such an operation is carried out as multiplexing some types of packets into other types of packets.

As described above, the present invention can be widely applied to switching apparatuses comprising an input packet processing circuit (input port) which determines whether an input including packet includes an included packet and which performs, for an including packet which includes said included packet, demultiplexing processing of said included packet, header processing for the header of said included packet, and mapping processing for mapping a respective demultiplexed included packet associated with a switching including packet for switching processing; a switch for performing switching processing of said switching including packet and a switching including packet which does not include said included packet; and an output packet processing circuit which determines whether a switching including packet which is switched and outputted from said switching includes an included packet and which performs, for a switching including packet which includes said included packet, demultiplexing processing of said included packet and re-mapping processing for mapping said demultiplexed included packet in an including packet that is different from a switching including packet, As described above, the present invention allows as many included packets as possible to be mapped to one in-switch including packet, thereby providing an expected increase in efficiency in processing of a switching apparatus, improved switching capacity, and increased service efficiency of the resources of the switching apparatus.

What is claimed is:

1. A switching apparatus comprising:

an input packet processing circuit which determines whether an input including packet includes an included packet and which performs, for an including packet which includes said included packet, demultiplexing processing of said included packet, header processing for a header of said included packet, and mapping processing for mapping a respective demultiplexed included packet associated with a switching including packet for switching processing, a switch for performing switching processing of said switching including packet and a switching including packet which does not include said included packet, and an output packet processing circuit which determines whether a switching including packet which is switched and outputted from said switch includes an included packet and which performs, for a switching including packet which includes said included packet, demultiplexing processing of said included packet and re-mapping processing for mapping said demultiplexed included packet in an including packet that is different from a switching including packet, wherein said input packet processing circuit comprising an included packet filling means wherein, at the time of said mapping processing, a number of included packets corresponding to a length of said switching including packets and a length of the associated included packets is mapped in one switching including packet as long as the header information thereof can be shared in common.

2. The switching apparatus according to claim 1, wherein said header information is address information and/or service quality class information owned by said included packet, at a stage prior to said mapping processing, a plurality of temporary store means are provided, which store said included packets temporarily, in response to said header information, and said included packet filling means perform calculations for included packets stored in the same temporary store means in advance, thereby determining the number corresponding to the length of the said switching including packets and the length of the associated included packets.

3. The switching apparatus according to claim 1, wherein said switching including packet includes a plurality of included packets to perform said re-mapping processing, provided that re-mapping information to be used in the output packet processing circuit is identical; the header of said switching including packet storing said re-mapping information.

4. The switching apparatus according to claim 1, wherein said switching including packet is provided externally with a plurality of re-mapping information used in the output packet processing circuit to perform said re-mapping processing corresponding to respective included packets.

5. The switching apparatus according to claim 1, wherein said switching including packet is provided internally with a plurality of re-mapping information used in the output packet processing circuit to perform said re-mapping processing corresponding to respective included packets.

6. The switching apparatus according to claim 2, wherein said switching including packet includes a plurality of included packets to perform said re-mapping processing, provided that re-mapping information to be used in the output packet processing circuit is identical; the header of said switching including packet stores this re-mapping information.

7. The switching apparatus according to claim 2, wherein said switching including packet is provided externally with a plurality of re-mapping information used in the output packet processing circuit to perform said re-mapping processing corresponding to respective included packets.

8. The switching apparatus according to claim 2, wherein said switching including packet is provided internally with a plurality of re-mapping information used in the output packet processing circuit to perform said re-mapping processing corresponding to respective included packets.

* * * * *